United States Patent [19]

Shimomura

[11] Patent Number: 5,210,979
[45] Date of Patent: May 18, 1993

[54] CUTTING METHOD WITH A ROTARY SHEET HONE

[75] Inventor: Taizo Shimomura, Kawasaki, Japan

[73] Assignee: Kabushiki Kaisha Shimomura Seisakusho, Kanagawa, Japan

[21] Appl. No.: 762,791

[22] Filed: Sep. 20, 1991

Related U.S. Application Data

[63] Continuation of Ser. No. 614,250, Nov. 15, 1990, abandoned.

[30] Foreign Application Priority Data

Nov. 17, 1989 [JP] Japan .................. 1-299145

[51] Int. Cl.$^5$ .............................. B24B 49/08
[52] U.S. Cl. .................. 51/165.9; 51/34 D; 51/33 R; 51/281 R
[58] Field of Search ............ 51/165.9, 165.85, 33 R, 51/34 C, 34 D, 37, 38, 54, 55, 56 R, 281 R, 326

[56] References Cited

U.S. PATENT DOCUMENTS

| | | |
|---|---|---|
| 2,855,733 | 10/1958 | Allison .................. 51/33 R |
| 3,126,672 | 3/1964 | Calvert et al. .................. 51/34 C |
| 4,062,151 | 12/1977 | Hjaimarson .................. 51/165.9 |
| 4,186,526 | 2/1980 | Harmant .................. 51/165.9 |
| 4,627,196 | 12/1986 | Veale .................. 51/165.9 |

FOREIGN PATENT DOCUMENTS 0083359  5/1982  Japan .................. 51/34 D

*Primary Examiner*—Bruce M. Kisliuk
*Assistant Examiner*—Eileen P. Morgan
*Attorney, Agent, or Firm*—Bauer & Schaffer

[57] ABSTRACT

The cutting of such inorganic substances as ceramics and other materials that are hard to cut with a rotary sheet hone made of hone particles and a binder is accomplished by repeatedly varying the force of engagement of the rotary sheet hone with the workpiece between a released condition and a maximum value. Apparatus for carrying out this method includes hydraulic or pneumatic cylinders acting on the cutting element in opposite direction via a linkage so as to move the cutting element alternately into and out of engagement with the article to be cut.

2 Claims, 3 Drawing Sheets

CUTTING METHOD WITH A ROTARY SHEET HONE

This is a continuation of Ser. No. 614,250, filed: Nov. 15, 1990, now abandoned

FIELD OF THE INVENTION

The present invention relates to a method for cutting such hard to cut materials as ceramics using a rotary sheet hone or circular abrasive wheel made of hone particles and a binder.

BACKGROUND OF THE INVENTION

Inorganic substances such as ceramic and other materials hard to cut are difficult to shear or thermally cut with a gas or the like. Conventionally, a circular wheel made of a hone and binder is used. The wheel is pressed under a fixed pressure against the ceramic workpiece, which is fed with a coolant, i.e. oil or water, to cut the workpiece while being The above-mentioned conventional cutting method has the defect that the cutting speed is limited and the durability of the sheet hone is short.

When the sheet hone is rotated while constantly pressing against the work under a fixed pressure, the sheet hone is always kept in contact with the workpiece against the entire surface being cut. Therefore, the contact area is large, acting to break the rotation of the sheet hone, reducing the cutting speed, and resulting in lengthening of the cutting operation.

Further, when the sheet hone is rotated under a constant fixed pressure, the penetration of the coolant (oil or water) onto the part to be cut will be difficult, and neither the sheet hone nor the workpiece will be sufficiently cooled. Consequently, both the sheet hone and the workpiece will be heated to a high temperature, the cutting capacity will be reduced and the workpiece denatured and separated by deterioration or the like of the binder. In some cases, the sheet hone will break.

SUMMARY OF THE INVENTION

The present invention has been made in view of the above-mentioned circumstances and has as an object the provision of an efficient cutting work to improve the durability of a sheet hone and to prevent the workpiece from being denatured by heat.

In order to attain the above-mentioned object, the method of the present invention is to cut the workpiece by repeatedly varying the engaging or pressing force of the rotary sheet hone (circular wheel) on the workpiece between a released condition and a maximum engaging condition.

Viewed from another aspect, the present invention provides apparatus for cutting an article, comprising a rotary cutting element and means for repeatedly urging said cutting element into and out of engagement with said article.

Preferably, the means for urging the cutting element comprises a fluid motor system such as hydraulic or pneumatic piston and cylinder and switching means for switching the system between a first condition in which the cutting element is urged into engagement with the workpiece and a second condition in which the said cutting element is urged out of engagement with workpiece.

The urging means comprises first and second hydraulic or pneumatic cylinders adapted to act via a linkage on the cutting element in opposite directions, and the switching means comprises valve means for alternately connecting a source of pressure with the first and second cylinders, respectively, whereby the cutting element is caused to reciprocate into and out of engagement with the article to be cut.

An embodiment of the invention will now be described by way of example and with reference to the accompanying drawings.

DETAILED DESCRIPTION OF THE INVENTION

Figure 1:
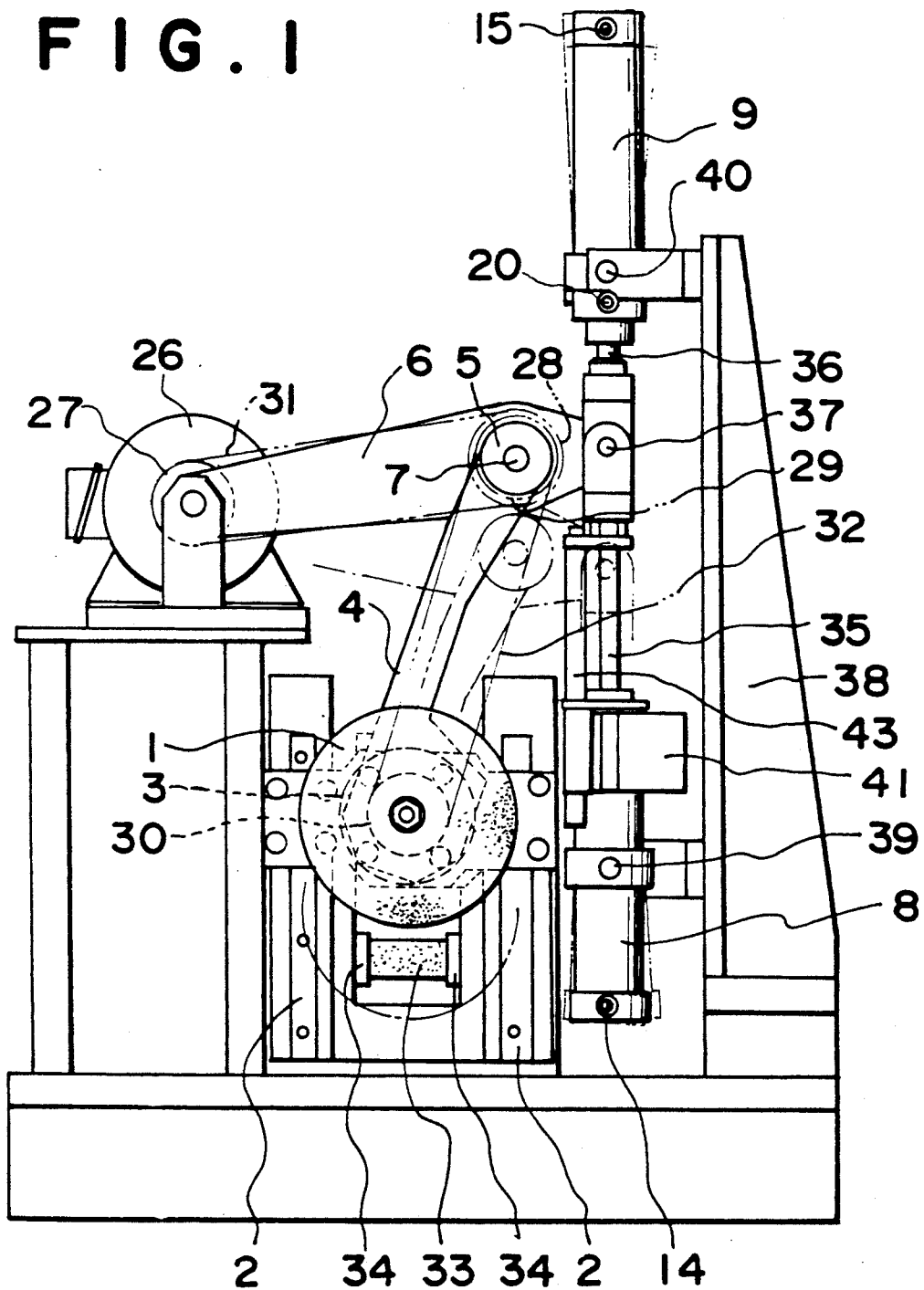
FIG. 1 is a partly-sectioned elevational view showing an example of an apparatus for cutting a workpiece.
Figure 2:
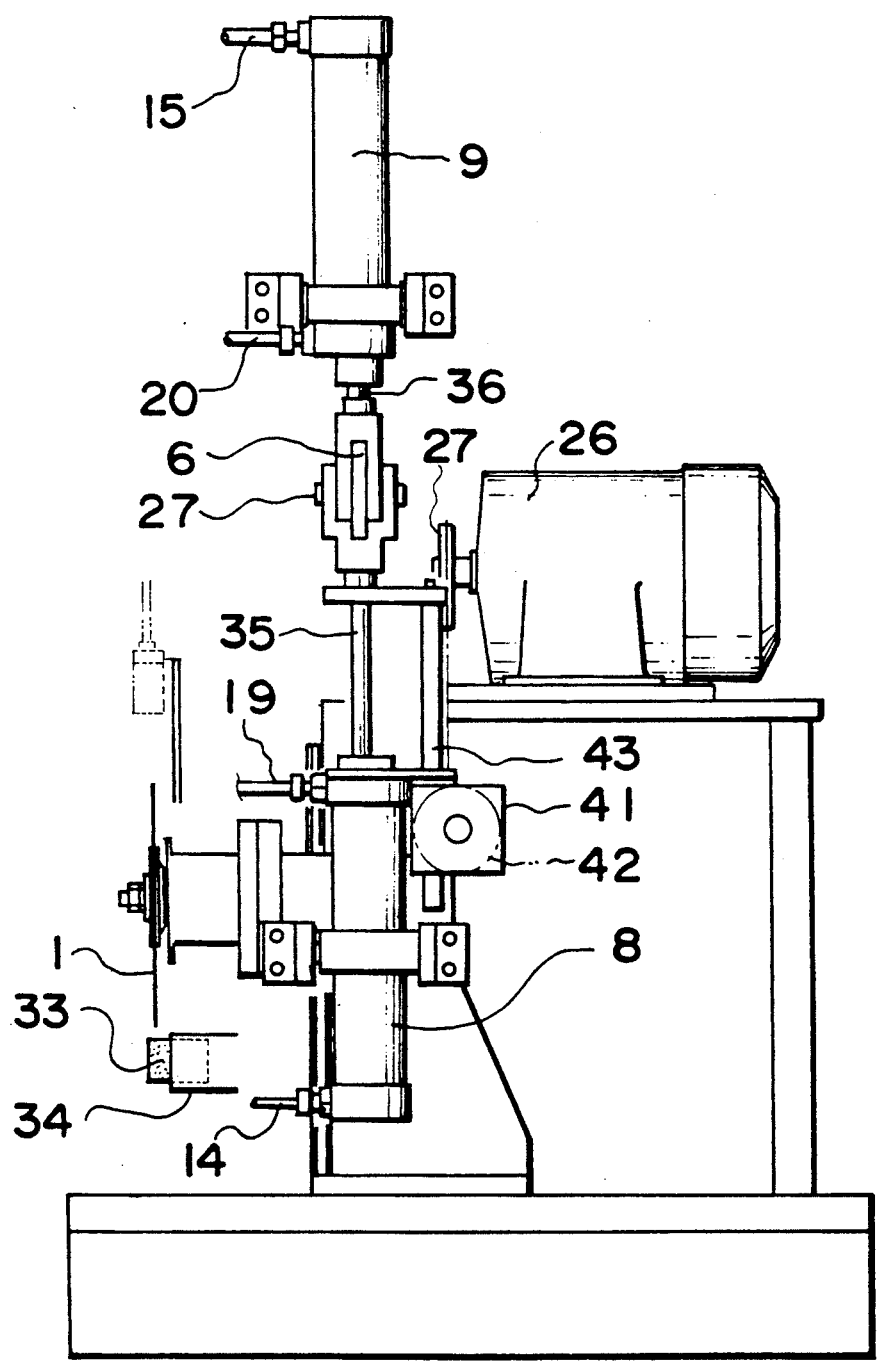
FIG. 2 is a side view of the apparatus shown in FIG. 1.

In FIGS. 1 and 2, the reference numeral represents a sheet hone or circular cutting element movable vertically between frame side guides 2.

A movable rod 4 extends from a bearing 3 on which the sheet hone 1 is journalled. The rod 4 is pivotally attached at its upper end 5 to a vertically moving rod 6 by a pin 7. The rod 6 is vertically movable by a pair of air cylinders 8 and 9 so that the control of the fluctuation of the pressing force of the sheet hone 1 and the release of the pressing force may be repeated through the movable rod 4.

A motor 26 is provided for rotating the sheet hone 1 through a pulley 27 mounted on the rotary shaft of the motor 26. Pulleys 28 and 29 are mounted on the pin 7, and a pulley 30 is mounted on the rotary shaft of the sheet hone 1. A driving belt 31 is entrained between the pulleys 27 and 28, and a driving belt 32 is entrained between the pulleys 29 and 30.

In the above-mentioned construction, the sheet hone 1 is rotated by the motor 26 through the pulley 27, driving belt 31, pulleys 28 and 29, driving belt 32, and pulley 32. The workpiece 33 is held in a holder 34 beneath the sheet hone 1.

As previously mentioned, the sheet hone 1 is vertically movable to move the piston rods 35 and 36 of the air cylinders 8 and 9 are connected with each other through a pin 37 to which the tip of the rod 6 opposite the motor 26 is connected. The air cylinders 8 and 9 are supported on a frame 38 by pins 39 and 40 so as to be rockable with respect to the frame 38.

When the vertically movable rod 6 is displaced at the tip connected to pin 37 by the air cylinders 8 and 9, the tip end of the rod 6 will move arcuately, and therefore, the air cylinders 1 and 2 will be caused to rock about the axes of the pins 39 and 40. An encoder 41, within which a pinion 42 is provided, is mounted on the frame, and a rack connected from the piston rod 35 meshes with the pinion 42. In this manner, the vertically moving stroke of the piston rods 35 and 36 is detected to be utilized to provide the controlled fluctuation of the pressing force and the release of the pressing force.

Figure 3:
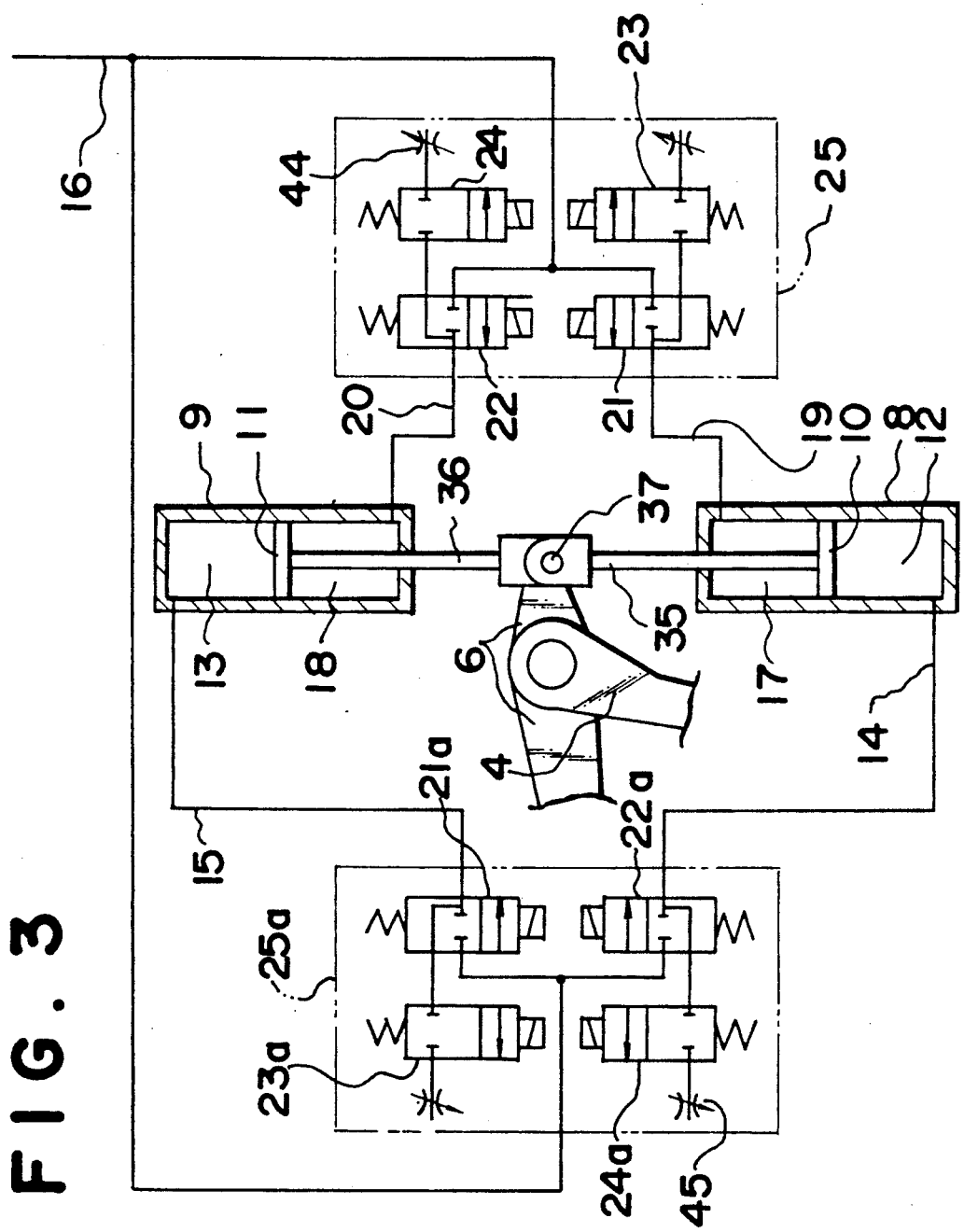
FIG. 3 is a diagrammatic view of a control circuit for use with the apparatus shown in FIG. 1.

As seen in FIG. 3, a switching valve 25 is provided for feeding air under pressure via conduits 14 and 15 to and from the head compartments 12 and 13 of each of the cylinders 8 and 9. The conduits 14 and 15 are connected to the source of air via conduit 16.

Similarly, a switching valve 25 is provided having conduits 19 and 20 connected to the piston rod compartments 17 and 18 of the cylinders 8 and 9. The conduits 19 and 20 are connected with the conduit 16 to discharge air to the source.

The switching valve 25 is formed by combining valves 21, 22, 23, and 24, each having two ports so that the valves 21 and 24 may be simultaneously operated to be opened or closed and the valves 22 and 23 may be simultaneously operated to be opened or closed.

The switching valve 25a is constructed and functions in exactly the same way.

By operating the switching valves 25 and 25a from the operating pressure conduit 16, air under a fixed operating pressure will be fed to the rod compartment 17 of the air cylinder 8 and head compartment 13 of the air cylinder 9, and contrary, air in the head compartment 12 of the air cylinder 8 and the rod compartment 18 of the air cylinder 9 will be discharged. Thus, the sheet hone 1 is lowered through the movable rod 4 and vertically moving rod 6. By the reverse switching operation, the sheet hone 1 is elevated.

When the valves 21 and 24 of the switching valve 25 are simultaneously opened, the conduit 16 will be in communication with the rod compartment 17 of the air cylinder 8 through the valve 21 and conduit 19. On the other hand, the rod compartment 18 of the air cylinder 9 will be opened to the atmosphere through the conduit 20, valves 22 and 24 and a throttle valve 44. When the valves 21a and 24a of the switching valve 25a are simultaneously opened, the operating pressure conduit 16 will be in communication with the head compartment 13 of the air cylinder 9 through the valve 21a and conduit 15. On the other hand, the head compartment 12 of the air cylinder 8 will be opened to the atmosphere through the conduit 14, valves 22a and 24a, and a throttle valve 45 so that the sheet hone 1 may be lowered to press the article 33 to be worked.

By an operation reverse to that described above the switching valves 25 and 25a can be made to cause the sheet hone 1 to be elevated to vary and release the pressing force. That is to say, by opening the valves 22 and 23 of the switching valve 25 and the valves 22a and 23a of the switching valve 25a, the sheet hone 1 is elevated to effect the variation and release the pressing force on the workpiece 33 to be cut.

As mentioned above, by selectively operating the switching valves 25 and 25a to be opened and closed, the vertically moving rod 6 can be raised and lowered, and the fluctuation control and release of the pressing force of the sheet hone 1 can be repeated through the movable rod 4.

According to the present invention, the sheet hone 1 is rotated by the motor 26 and is further vertically moved by the switching operation of the switching valves 25 and 25a, independently of each other, and the fluctuation of the pressing force is controlled in the upper limit position, and the pressing force is controlled in the released state. It will be appreciated that while a pneumatic control system is described, it may just as well be provided with a hydraulic fluid system.

Therefore, since the sheet hone 1 is not always in contact with the workpiece 33 on its entire surface being of the pressed part to be cut as heretofore, as was the case in the conventional systems, its rotation will recover its normal state even when the sheet hone 1 is braked or when the pressing force is small or when the pressing force is released so that the cutting work will be quickly resumed. Therefore, the cutting efficiency is high, the part not yet cut will be first cut in the next cutting, and thus, the once cut area is maintained small, all therefore improving the cutting efficiency.

Further, when the pressing force is small and when the pressing force is released the coolant (oil or water) will penetrate the part being cut so that the sheet hone 1 and workpiece 33 will not be heated more than is necessary. Consequently, the durability of the sheet hone 1 is improved and the workpiece prevented from being denatured by heat.

Further, the cutting efficiency and durability of the sheet hone is improved to be about twice as high as before, and even if cheap hone particles and binders are used, the desired cutting objective will be able to be economically attained.

It will also be appreciated that the principles of the present invention may be applied equally to other tools in which the tool is moved into and out of engagement with a workpiece. As an example, the boring of holes in ceramic workpieces, using a boring or drilling tool may be carried out without material change in the present invention.

I claim:

1. A method of performing work on a workpiece employing a tool adapted to engage the workpiece, comprising the steps of oscillating the tool into and out of maximum engagement with the workpiece, said oscillation being performed so as to cause said tool to constantly reciprocate between a condition of less than disengagement and a condition of maximum engagement with said workpiece and thereby constantly varying the force at which said tool is urged in each direction to maintain said tool in engagement with said workpiece to provide a uniform cutting of the workpiece.

2. The method according to claim 1, wherein the tool is a rotary cutting element, said method including the step of continuously rotating said cutting tool while reciprocating said tool.

* * * * *